(12) United States Patent
Purdy et al.

(10) Patent No.: US 11,248,166 B2
(45) Date of Patent: Feb. 15, 2022

(54) COMPOSITION TO REDUCE FRICTION REDUCER FOULING IN WELLBORES

(71) Applicant: Fluid Energy Group Ltd., Calgary (CA)

(72) Inventors: Clay Purdy, Medicine Hat (CA); Markus Weissenberger, Calgary (CA); Kyle Wynnyk, Calgary (CA); Matthew Kye Yocham, Oklahoma City, OK (US)

(73) Assignee: FLUID ENERGY GROUP LTD., Calgary (CA)

( * ) Notice: Subject to any disclaimer, the term of this patent is extended or adjusted under 35 U.S.C. 154(b) by 0 days.

(21) Appl. No.: 17/010,212

(22) Filed: Sep. 2, 2020

(65) Prior Publication Data

US 2021/0079292 A1 Mar. 18, 2021

(30) Foreign Application Priority Data

Sep. 4, 2019 (CA) .................. CA 3054052

(51) Int. Cl.
| | |
|---|---|
| *E21B 43/27* | (2006.01) |
| *C09K 8/74* | (2006.01) |
| *C09K 8/72* | (2006.01) |
| *C09K 8/54* | (2006.01) |

(52) U.S. Cl.
CPC .................. *C09K 8/74* (2013.01); *C09K 8/54* (2013.01); *C09K 8/725* (2013.01); *E21B 43/27* (2020.05); *C09K 2208/28* (2013.01); *C09K 2208/32* (2013.01)

(58) Field of Classification Search
CPC . C09K 8/74; C09K 8/54; C09K 8/725; C09K 2208/28; C09K 2208/32; E21B 43/27
See application file for complete search history.

(56) References Cited

U.S. PATENT DOCUMENTS

| | | | |
|---|---|---|---|
| 4,815,537 A | 3/1989 | Jones | |
| 5,497,830 A | 3/1996 | Boles et al. | |
| 6,265,355 B1 | 7/2001 | Lai et al. | |
| 6,436,880 B1 | 8/2002 | Frenier | |
| 7,846,878 B2 | 12/2010 | Robb et al. | |
| 7,923,414 B2* | 4/2011 | Lin ...................... | C09K 8/035 507/128 |
| 8,567,504 B2* | 10/2013 | Welton .................. | C09K 8/68 166/312 |
| 8,772,206 B2* | 7/2014 | Mirakyan .............. | C09K 8/845 507/225 |
| 9,650,299 B2 | 5/2017 | Alwattari et al. | |
| 9,932,516 B2 | 4/2018 | Conway | |
| 2008/0190609 A1* | 8/2008 | Robb .................... | C09K 8/68 166/279 |
| 2014/0124205 A1 | 5/2014 | Nasr-El-Din et al. | |
| 2015/0344771 A1* | 12/2015 | Jiang .................... | C09K 8/74 166/305.1 |
| 2019/0040298 A1* | 2/2019 | Purdy ................... | C05B 11/04 |
| 2019/0345376 A1* | 11/2019 | Purdy ................... | C09K 8/032 |

FOREIGN PATENT DOCUMENTS

WO 2012116032 A1 8/2012

* cited by examiner

*Primary Examiner* — Silvana C Runyan
(74) *Attorney, Agent, or Firm* — Berg Hill Greenleaf Ruscitti, LLP.

(57) ABSTRACT

A method of spearheading an acid into a wellbore is adapted to avoid the gelation of a friction reducer polymer. The method comprises injecting a synthetic or modified acid composition down a wellbore, the composition comprising: a synthetic or modified acid; a solvent; and a chelating agent. Optionally the composition may comprise a corrosion inhibitor package. The method further includes allowing sufficient time for the synthetic or modified acid composition to react with material which require acidic treatment and injecting a fracturing composition comprising a liquid and a friction reducing polymer down the wellbore.

17 Claims, 1 Drawing Sheet

1X zoom 1X zoom 40X zoom 40X zoom

COMPOSITION TO REDUCE FRICTION REDUCER FOULING IN WELLBORES

CROSS REFERENCE TO RELATED APPLICATIONS

This application claims the benefit of and priority to Canadian Patent Application No. 3,054,052, filed Sep. 4, 2019. The entire specification and figures of the above-referenced application are hereby incorporated, in their entirety by reference.

FIELD OF THE INVENTION

The present invention is a liquid acidic composition for application in the oil & gas industry, more specifically, the composition is invented to reduce negative friction reducer compatibility issues in higher iron bearing formations.

BACKGROUND OF THE INVENTION

In the oil and gas industry, friction reducers are widely applied in fracturing operations (slick water fracs) to minimize frictional losses during pumping operations. Indeed during several types of operations, namely, drilling, completion and stimulation of subterranean wells, injected fluids are often pumped downhole at very high rates, in particular during fracking operations. During the injection, there is often frictional losses of energy due to fluidic turbulence and friction. Without the use of friction reducers, these frictional energy losses may require additional horsepower to pump or place the fluids and proppant at a rate capable of achieving the designed or engineered stimulation program injection rates. To minimize frictional energy losses, certain friction reducing polymers have been incorporated in the fluids prior to their injection downhole.

To achieve this high molecular weight (Mw) polymers are utilized. The drag reduction properties of high Mw polymers arise from polymer elongation, which dampens the quasi-streamwise vortices that are characteristic of turbulent flow. The drag reduction properties increase with increasing Mw due to the more pronounced stretching of the very long polymer chains. Typically, three classes of polymers are used for this application: non-ionic-; anionic; and cationic polymers. Characteristic for all three classes is that at least one monomer is acrylamide and therefore the resulting polymers are polyacrylamides, co-polyacrylamides or ter-polyacrylamides. The hydrolyzed form of Polyacrylamide (HPAM), a co-polymer of acrylamide and acrylic acid, is the most widely used anionic friction reducer in oil and gas applications.

Polyacrylamides (PAM, HPAM etc.) can undergo different degradation processes. The one of interest for the current invention is the further hydrolysis at a low pH (acidic conditions) under downhole conditions (elevated temperature and pressure). The hydrolysis of amide groups leads to the generation of carboxylic acid groups and therefore to an increased number of negative charges along the polymer chain. If in the formation increased $Fe^{2+}/Fe^{3+}$ concentrations are present, this can lead to the formation of complexes, which are crosslinking polymer chains. With increased crosslinks the high Mw polymers have tendency to form a gel, similar to super absorbers.

It is theorized that the described gel formation becomes a more severe problem, if during the individual stages of fracturing operations (slick-water fracs) a spearhead acid for the initial cement and/or formation break down is utilized. With such an operational procedure the risk increases that the utilized friction reducers are undergoing the described hydrolysis. If then $Fe^{2+}/Fe^{3+}$ ions are present the described gel formation can cause major production shut-offs and costly remediation procedures to remove the formed gel plugs downhole.

Some prior art documents describe slick water problems and propose solutions. Among them, U.S. Pat. No. 7,846,878 teaches a method that comprises: introducing a treatment fluid into a subterranean formation, wherein the treatment fluid comprises water and a concentrated polymer composition comprising a complexing agent and a friction reducing polymer. Also disclosed is a method that comprises combining at least water and a concentrated polymer composition to form a treatment fluid, wherein the concentrated polymer composition comprises a complexing agent and a friction reducing polymer; and introducing the treatment fluid into a subterranean formation. Also disclosed is a concentrated polymer composition comprising: a friction reducing polymer in an amount of about 15% to about 60% by weight of the composition; and a complexing agent.

U.S. Pat. No. 6,265,355B1 teaches a composition containing a chelating agent and an amino carboxylic acid and a method for breaking a gel formed by a crosslinkable polymer and a crosslinking agent. The composition may also be used for selectively removing crosslinked polymer gels from an oil-bearing zone in a subterranean formation in the presence of a water formation plugged by a crosslinkable polymer and a crosslinking agent. Aqueous solutions of phosphonates and sulfonates are also useful in the method.

U.S. Pat. No. 4,815,537A teaches an improved sweep efficiency obtained in an oil recovery process wherein oil is recovered from a subterranean, viscous oil containing formation having relatively highly permeable zones and relatively low permeability zones penetrated by at least one injection well and at least one spaced apart production well in fluid communication with a substantial portion of the formation. It is stated that first, a predetermined amount of gel solution is injected into the formation at high pressure to deeply penetrate and plug the fracture face and highly permeable zones of the formation. Thereafter, a breaker material such as hydrochloric acid is injected into the formation at a low pressure to break the gel and displace it from the fracture face and highly permeable zones in the vicinity of the injection well thereby reestablishing injectivity into the formation in the vicinity of the injection well. Thereafter, a flooding agent such as carbon dioxide, steam or water is injected into the formation that displaces oil through the low permeability unswept zones of the formation and fluids including oil are recovered from the formation through the production well.

US patent application number US2014/0124205A1 discloses a process for fracturing a subterranean formation comprising a step of fracturing the formation and a step of introducing a treatment fluid containing glutamic acid N,N-diacetic acid or a salt thereof (GLDA), methylglycine N,N-diacetic acid or a salt thereof (MGDA) and/or N-hydroxyethyl ethylenediamine N,N',N'-triacetic acid or a salt thereof (HEDTA) into the formation, wherein the fracturing step can take place before introducing the treatment fluid into the formation, while introducing the treatment fluid into the formation or subsequent to introducing the treatment fluid into the formation.

U.S. Pat. No. 9,650,299 B2 teaches methods and compositions for the treatment of subterranean formations. In various embodiments, the method includes obtaining or providing a composition including at least one-ion sequestering compound, sequestering at least one ion from a polymer in the composition with the at least one ion-sequestering compound, and contacting a subterranean material downhole with the composition.

U.S. Pat. No. 9,932,516 B2 teaches a composition used to prevent the interaction between a polymer in a water-based fracturing fluid and naturally-occurring metal ions. The composition includes a metal-complexing agent, such as a chelating agent. The chelating agent can also be biodegradable and is citric acid in embodiments. The metal-complexing agent can be coated with one or two coatings to create a time-released form. The time-released form prevents loss of the agent prior to delivery at the shale.

International patent application WO2012/116032A1 discloses a breaker fluid may include a base fluid; and an inactive chelating agent. A process may include pumping a first wellbore fluid comprising an inactive chelating agent into a wellbore through a subterranean formation; and activating the inactive chelating agent to release an active chelating agent into the wellbore.

U.S. Pat. No. 5,497,830A teaches a particulate gel breaker for the controlled reduction in viscosity of aqueous acid compositions used in fracture acidizing of subterranean formations, such as in oil and gas wells, is formed for use with crosslinked polymer gels which are crosslinked with organometallic compounds, such as titanium or zirconium. The gel breaker is composed of particles containing complexing materials such as fluoride, phosphate, sulfate anions and multi-carboxylated compounds, which are capable of complexing with the organometallic crosslinking compounds of the gel. The particles are said to be coated with a water insoluble wood resin coating which reduces the rate of release of the complexing materials of the particles so that the viscosity of the gel is reduced at a retarded rate. It is said that the gel can thus be introduced into the well at a sufficiently high viscosity for fracturing and to allow time for the acid to penetrate the formation before the acid is released.

U.S. Pat. No. 9,932,516 B2 teaches a composition used to prevent the interaction between a polymer in a water-based fracturing fluid and naturally-occurring metal ions. The composition includes a metal-complexing agent, such as a chelating agent. The chelating agent can also be biodegradable and is citric acid in embodiments. The metal-complexing agent can be coated with one or two coatings to create a time-released form. The time-released form prevents loss of the agent prior to delivery at the shale.

U.S. Pat. No. 6,436,880 B1 teaches that an acidic fluid that is useful in stimulation and workover operations, and in particular, for the control of iron in acidizing operations, the removal of alkaline earth carbonate scale in scale removal operations, and matrix or fracture acidizing operations, comprises an acid, such as hydrochloric acid; water; and a hydroxyethylaminocarboxylic acid. Preferred hydroxyethylaminocarboxylic acids are hydroxyethylethylenediaminetriacetic acid (HEDTA) and hydroxyethyliminodiacetic acid (HEIDA). Also disclosed herein are methods of controlling iron, removing alkaline earth carbonate scale, or matrix or fracture acidizing, involving the use of the acidic fluid.

The most commonly used chelating agents are typically EDTA-based agents. Concerns have been raised with the extensive use of these chelating agents as they may exhibit some drawbacks which had not previously been considered. Direct and indirect potential effects of the presence of EDTA in the environment have been studied. EDTA has been found to mobilize contaminant metal ions, particularly heavy metals. Studies have also discovered that EDTA can solubilize radioactive metals and increase their environmental mobility. Other studies have revealed the toxicity of EDTA photosynthetic organisms and as it may inhibit cellular division, chlorophyll synthesis and algal biomass production. The same studies pointed out that the same concentration of EDTA chelated with micronutrients was shown to not have these deleterious properties.

Despite the prior art teachings, there still exists a need for a composition to use in slickwater fracturing or stimulation treatments to avoid and/or minimize the formation of polymer/metal complexes which lead to losses in oil production. Preferably, to overcome this need, the composition should not rely on the use of an EDTA-based chelating agent if at all possible.

SUMMARY OF THE INVENTION

The inventors have studied the possibility to mitigate the formation of polymer/polymer complexes via $Fe^{2+}/Fe^{3+}$ crosslinks, by introducing into the spearhead acid an additional chelating agent compound, which has the ability to form a more stable complex with $Fe^{2+}/Fe^{3+}$. Such chelating agents include: tetra sodium EDTA; EDTA; propylenediaminetetraacetic acid (PDTA); nitrilotriacetic acid (NTA); N-(2-hydroxyethyl)ethylenediaminetriacetic acid (HEDTA); diethylenetriaminepentaacetic acid (DTPA); hydroxyethyliminodiacetic acid (HEIDA); cyclohexylenediaminetetraacetic acid (CDTA); diphenylaminesulfonic acid (DPAS); ethylenediamined(o-hydroxyphenylacetic) acid (EDDHA); sodium gluconate; gluconic acid; malonic acid; succinic acid; glutaric acid; adipic acid; pimelic acid; suberic acid; azelaic acid; isocitric acid; citric acid; tetrasodium glutamate diacetate and glutamic acid diacetic acid (GLDA); salts thereof, and mixtures thereof It is an object of the present invention to provide a modified acid composition which can be used over a broad range of applications in the oil and gas industry and which exhibit advantageous properties over known compositions. According to an aspect of the present invention, there is provided a synthetic or modified acid composition comprising: a chelating agent compound and a synthetic or modified acid.

According to an aspect of the present invention, there is provided a composition for use in reducing the gelation caused when there is contact between a friction reducer and free metal ions during oilfield operations. Friction reducers typically breakdown when exposed to acidic conditions.

According to an aspect of the present invention, there is provided a method of spearheading an acid into a wellbore adapted to avoid the gelation of a friction reducer polymer, wherein said method comprises:

injecting a synthetic or modified acid composition down a wellbore, said composition comprising: a synthetic or modified acid; a solvent; and a chelating agent compound, optionally the composition may comprise a corrosion inhibitor package;

allowing sufficient time for the synthetic or modified acid composition to react with material which require acidic treatment;

injecting a fracturing composition comprising a liquid and a friction reducing polymer down the wellbore.

According to another aspect of the present invention, there is provided a method of spearheading an acid into a wellbore adapted to reduce the gelation of a friction reducer polymer, wherein said method comprises:

injecting a synthetic or modified acid composition down a wellbore, said composition comprising: a synthetic or modified acid; a solvent; and a chelating agent compound, optionally the composition may comprise a corrosion inhibitor package;

allowing sufficient time for the synthetic or modified acid composition to react with material which require acidic treatment;

injecting a fracturing composition comprising a liquid and a friction reducing polymer down the wellbore.

Preferably, the synthetic or modified acid is selected from the group consisting of: Urea-HCl; amino acid-HCl; and alkanolamine-HCl. Preferably, the amino acid is selected from the group consisting of: lysine; glycine; sarcosine, betaine (such as trimethyl glycine), dimethyl glycine (DMG), iminodiacetic acid (IDA), alanine, asparagine, aspartic acid, cysteine, glutamic acid, histidine, leucine, lysine, methionine, proline, serine, threonine or valine or combinations thereof. More preferably, the amino acid is lysine. According to another preferred embodiment, the acid is a sulfonic acid selected from the group consisting of: methanesulfonic acid and toluenesulfonic acid.

According to a preferred embodiment of the present invention, the alkanolamine is selected from the group consisting of: monoethanolamine; diethanolamine; and tri-ethanolamine. Preferably, the alkanolamine is monoethanolamine. According to a preferred embodiment, the acid is an aqueous modified acid composition wherein the hydrochloric acid and alkanolamine are present in a molar ratio of not more than 7.0:1. More preferably, hydrochloric acid and alkanolamine are present in a molar ratio of not more than 4:1. Even more preferably, hydrochloric acid and alkanolamine are present in a molar ratio of not more than 3:1. According to another preferred embodiment of the present invention, the method uses a synthetic or modified acid composition comprising: a strong acid, such as hydrochloric acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

According to a preferred embodiment of the present invention, the chelating agent compound is present in the synthetic acid composition in an amount ranging from 0.1 wt % to 5 wt %. More preferably, the chelating agent compound is present in the synthetic acid composition in an amount ranging from 0.5 wt % to 2 wt %. Most preferably, the chelating agent compound is present in the synthetic acid composition in an amount of about 1 wt %.

According to another aspect of the present invention, there is provided a method of selectively depleting divalent cations present in a spent spearheading acid composition into a wellbore, wherein said method comprises:

injecting a synthetic or modified acid composition down a wellbore, said composition comprising: a synthetic or modified acid; a solvent; and a chelating agent compound, optionally the composition may comprise a corrosion inhibitor package;

allowing sufficient time for the synthetic or modified acid composition to react with material which require acidic treatment; and allowing sufficient time for the chelating agent to remove cations for the spent acid.

Preferably, the method further comprises the injection of a fracturing composition comprising a liquid and a friction reducing polymer down the wellbore.

BRIEF DESCRIPTION OF THE FIGURES

The invention may be more completely understood in consideration of the following description of various embodiments of the invention in connection with the accompanying figure, in which.

DETAILED DESCRIPTION OF THE PREFERRED EMBODIMENTS

Figure 1:
FIG. 1 is a photograph of the reprecipitated solids from the addition of NaOH in spent acid blends.

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the present invention, there is provided a method of spearheading an acid into a wellbore adapted to avoid the gelation of a friction reducer polymer, wherein said method comprises:

injecting a synthetic or modified acid composition down a wellbore, said composition comprising: a synthetic or modified acid; a solvent; and a chelating agent compound, optionally the composition may comprise a corrosion inhibitor package;

allowing sufficient time for the synthetic or modified acid composition to react with material which require acidic treatment;

injecting a fracturing composition comprising a liquid and a friction reducing polymer down the wellbore.

Water Analysis Laboratory Tests

An operator requested specific tests for a wireline acid and the same acid further comprising a friction reducer polymer. A water analysis was performed on spent acid blends reacted with cuttings from Corbin (1608 5H-5X, 14800). A reprecipitation of solids was performed with the spent acid blends and the solids were sent for XRD analysis, while the filtered spent acid was sent for water analysis.

The acid blends (15% HCl, 33% MEA-HCl (in a 1:4.1 ratio) and 33% MEA-HCl (in a 1:4.1 ratio)-FR (FR referring to a friction reducer polymer) were spent in excess with the cuttings. Half of the spent fluid was sent to a third-party laboratory for water analysis. The MEA-HCl blend were made by admixing 1 mole of MEA for each 4.1 moles of HCl. The stock solution of MEA-HCl (in a 1:4.1 ratio) is referred to the 100% blend. Normally, this blend can be diluted to be tailored to the intended application, in this case, the stock solution is diluted down to a third of its concentration for this application when used with a wireline. To obtain a 4.1:1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). Circulation is maintained until all products have been solubilized. Additional products can now be added as required.

Sodium hydroxide was then added to the other half of the spent fluids up to pH of 9-10. The fluids were then filtered and sent to a third-party laboratory for water analysis, while the reprecipitated solids from the addition of sodium hydroxide were dried and sent to a different third-party laboratory for XRD analysis.

Procedure: The three acid blends (15% HCl, 33% MEA-HCl (in a 1:4.1 ratio), and 33% MEA-HCl (in a 1:4.1 ratio)-FR) were spent in excess with the drill cuttings (provided by Encana, Corbin 1608 5H-5X, 14800) at ambient temperature. The spent fluids were then filtered through P8 filter paper and packaged. The samples were sent to Bureau Veritas Laboratories for water analysis. Table 1 includes the results of the water analysis.

TABLE 1

Water analysis of spent acid blends

| | | COC Number | | | | | |
|---|---|---|---|---|---|---|---|
| | | Spent 15% HCl | | Spent 33% MEA-HCl (in a 1:4.1 ratio) | | Spent 33% MEA-HCl (in a 1:4.1 ratio)-FR | |
| | UNITS | TPL0004 | RDL | TPL0005 | RDL | TPL0006 | RDL |
| Calculated Parameters | | | | | | | |
| Anion Sum | meq/L | 4100 | N/A | 2000 | N/A | 1900 | N/A |
| Cation Sum | meq/L | 4200 | N/A | 1600 | N/A | 1600 | N/A |
| Hardness ($CaCO_3$) | mg/L | 150000 | 0.50 | 61000 | 0.50 | 62000 | 0.50 |
| Ion Balance (% Difference) | % | 0.75 | N/A | 11 | N/A | 6.4 | N/A |
| Dissolved Nitrate ($NO_3$) | mg/L | ND | 0.22 | 0.26 | 0.22 | ND | 0.89 |
| Nitrate plus Nitrite (N) | mg/L | ND | 0.071 | ND | 0.071 | ND | 0.28 |
| Dissolved Nitrite ($NO_2$) | mg/L | ND | 0.16 | ND | 0.16 | ND | 0.66 |
| Calculated Total Dissolved Solids | mg/L | 230000 | 1000 | 100000 | 500 | 99000 | 1000 |
| Misc. Inorganics | | | | | | | |
| Conductivity | uS/cm | >110000 (1) | 2.0 | >110000 (1) | 2.0 | >110000 (1) | 2.0 |
| pH | pH | 11.0 | N/A | 9.95 | N/A | 9.87 | N/A |
| Anions | | | | | | | |
| Alkalinity (PP as $CaCO_3$) | mg/L | 1300 | 1.0 | 8000 | 10 | 6500 | 10 |
| Alkalinity (Total as $CaCO_3$) | mg/L | 1500 | 1.0 | 11000 | 10 | 9700 | 10 |
| Bicarbonate ($HCO_3$) | mg/L | ND | 1.0 | ND | 10 | ND | 10 |
| Carbonate ($CO_3$) | mg/L | 230 | 1.0 | 4200 | 10 | 3800 | 10 |
| Hydroxide (OH) | mg/L | 380 | 1.0 | 1500 | 10 | 1100 | 10 |
| Dissolved Chloride (Cl) | mg/L | 150000 (2) | 1000 | 62000 (2) | 500 | 59000 (2) | 1000 |
| Dissolved Sulphate ($SO_4$) | mg/L | 200 | 1.0 | 150 | 1.0 | 160 (3) | 10 |
| Nutrients | | | | | | | |
| Dissolved Nitrite (N) | mg/L | ND (4) | 0.050 | ND (4) | 0.050 | ND (4) | 0.20 |
| Dissolved Nitrate (N) | mg/L | ND (4) | 0.050 | 0.058 (4) | 0.050 | ND (4) | 0.20 |
| Lab Filtered Elements | | | | | | | |
| Dissolved Calcium (Ca) | mg/L | 60000 (2) | 150 | 24000 (2) | 15 | 24000 (2) | 15 |
| Dissolved Iron (Fe) | mg/L | 0.27 | 0.060 | 0.17 | 0.060 | 130 | 0.60 |
| Dissolved Magnesium (Mg) | mg/L | 0.22 | 0.20 | 130 | 0.20 | 460 | 2.0 |
| Dissolved Manganese (Mn) | mg/L | 0.024 | 0.0040 | ND | 0.0040 | 3.8 | 0.040 |
| Dissolved Potassium (K) | mg/L | 210 | 0.30 | 150 | 0.30 | 160 | 3.0 |
| Dissolved Sodium (Na) | mg/L | 27000 (2) | 50 | 8000 (2) | 25 | 9000 (2) | 25 |

Water Analysis of Spent Acid Blends Re-Precipitation of Calcium Carbonate

Procedure:

The three acid blends (15% HCl, 33% MEA-HCl (in a 1:4.1 ratio), and 33% MEA-HCl (in a 1:4.1 ratio)-FR) were spent in excess with the drill cuttings (provided by Encana, Corbin 1608 5H-5X, 14800) at ambient temperature. The spent fluids were then filtered through P8 filter paper. Sodium hydroxide (NaOH) was then added dropwise to 450 mL of the spent acid blends to increase the pH. A pH probe was placed in the solution to monitor the pH of the solution as it was titrated. The test was performed at ambient temperature on a stir plate. The fluid was then filtered through P8 filter paper and packaged for water analysis. The solids collected from the filter paper were dried and packaged for XRD analysis. Table 2 includes the results of the water analysis.

TABLE 2

Water analysis results for spent acid blends reprecipitated with NaOH and filtered

| | | COC Number | | | | | |
|---|---|---|---|---|---|---|---|
| | | | Spent 15% HCl | | Spent 33% MEA-HCl (in a 1:4.1 ratio) | | Spent 33% MEA-HCl (in a 1:4.1 ratio)-FR |
| | UNITS | | TPL0004 | RDL | TPL0005 | RDL | TPL0006 | RDL |
| Calculated Parameters | | | | | | | | |
| Anion Sum | meq/L | | 4100 | N/A | 2000 | N/A | 1900 | N/A |
| Cation Sum | meq/L | | 4200 | N/A | 1600 | N/A | 1600 | N/A |
| Hardness ($CaCO_3$) | mg/L | | 150000 | 0.50 | 61000 | 0.50 | 62000 | 0.50 |
| Ion Balance (% Difference) | % | | 0.75 | N/A | 11 | N/A | 6.4 | N/A |
| Dissolved Nitrate ($NO_3$) | mg/L | | ND | 0.22 | 0.26 | 0.22 | ND | 0.89 |
| Nitrate plus Nitrite (N) | mg/L | | ND | 0.071 | ND | 0.071 | ND | 0.28 |
| Dissolved Nitrite ($NO_2$) | mg/L | | ND | 0.16 | ND | 0.16 | ND | 0.66 |
| Calculated Total Dissolved Solids | mg/L | | 230000 | 1000 | 100000 | 500 | 99000 | 1000 |
| Misc. Inorganics | | | | | | | | |
| Conductivity | uS/cm | | >110000 (1) | 2.0 | >110000 (1) | 2.0 | >110000 (1) | 2.0 |
| pH | pH | | 11.0 | N/A | 9.95 | N/A | 9.87 | N/A |
| Anions | | | | | | | | |
| Alkalinity (PP as $CaCO_3$) | mg/L | | 1300 | 1.0 | 8000 | 10 | 6500 | 10 |
| Alkalinity (Total as $CaCO_3$) | mg/L | | 1500 | 1.0 | 11000 | 10 | 9700 | 10 |
| Bicarbonate ($HCO_3$) | mg/L | | ND | 1.0 | ND | 10 | ND | 10 |
| Carbonate ($CO_3$) | mg/L | | 230 | 1.0 | 4200 | 10 | 3800 | 10 |
| Hydroxide (OH) | mg/L | | 380 | 1.0 | 1500 | 10 | 1100 | 10 |
| Dissolved Chloride (Cl) | mg/L | | 150000 (2) | 1000 | 62000 (2) | 500 | 59000 (2) | 1000 |
| Dissolved Sulphate ($SO_4$) | mg/L | | 200 | 1.0 | 150 | 1.0 | 160 (3) | 10 |
| Nutrients | | | | | | | | |
| Dissolved Nitrite (N) | mg/L | | ND (4) | 0.050 | ND (4) | 0.050 | ND (4) | 0.20 |
| Dissolved Nitrate (N) | mg/L | | ND (4) | 0.050 | 0.058 (4) | 0.050 | ND (4) | 0.20 |
| Lab Filtered Elements | | | | | | | | |
| Dissolved Calcium (Ca) | mg/L | | 60000 (2) | 150 | 24000 (2) | 15 | 24000 (2) | 15 |
| Dissolved Iron (Fe) | mg/L | | 0.27 | 0.060 | 0.17 | 0.060 | 130 | 0.60 |
| Dissolved Magnesium (Mg) | mg/L | | 0.22 | 0.20 | 130 | 0.20 | 460 | 2.0 |

TABLE 2-continued

Water analysis results for spent acid blends reprecipitated with NaOH and filtered

| | | COC Number | | | | | |
|---|---|---|---|---|---|---|---|
| | | Spent 15% HCl | | Spent 33% MEA-HCl (in a 1:4.1 ratio) | | Spent 33% MEA-HCl (in a 1:4.1 ratio)-FR | |
| UNITS | | TPL0004 | RDL | TPL0005 | RDL | TPL0006 | RDL |
| Dissolved Manganese (Mn) | mg/L | 0.024 | 0.0040 | ND | 0.0040 | 3.8 | 0.040 |
| Dissolved Potassium (K) | mg/L | 210 | 0.30 | 150 | 0.30 | 160 | 3.0 |
| Dissolved Sodium (Na) | mg/L | 27000 (2) | 50 | 8000 (2) | 25 | 9000 (2) | 25 |

Study of the Solids Re-Precipitated from NaOH with Spent Acid Blends

Procedure:

X-Ray diffraction (XRD) analysis at Calgary Rock and Materials Services Inc. was performed. The X-ray diffraction data for bulk and clay mineralogy was performed for three samples:

Solids re-precipitated from the addition of NaOH to 15% HCl spent with cuttings from Corbin 1608 5H-5X, 14800

Solids re-precipitated from the addition of NaOH to 33% MEA-HCl (in a 1:4.1 ratio) spent with cuttings from Corbin 1608 5H-5X, 14800

3) Solids re-precipitated from the addition of NaOH to 33% MEA-HCl (in a 1:4.1 ratio)-FR spent with cuttings from Corbin 1608 5H-5X, 14800

TABLE 3

Summary of XRD results of reprecipitated solid with NaOH

| | Sample 1) Solids reprecipitated from addition of NaOH to spent 15% HCl Weight % | Sample 2) Solids reprecipitated from addition of NaOH to spent 33% MEA-HCl (in a 1:4.1 ratio) Weight % | Sample 3) Solids reprecipitated from addition of NaOH to spent 33% MEA-HCl (in a 1:4.1 ratio)-FR Weight % |
|---|---|---|---|
| Bischofite | 43.1 | — | — |
| Brucite | 20.7 | — | — |
| Calcite | — | 28.2 | 0.0 |
| Halite | — | 71.8 | 100.0 |
| Halite | 9.7 | — | — |
| Iowaite | 26.5 | — | — |
| Total % | 100 | 100 | 100 |

These test results indicate that the composition used in Sample 3 has effectively sequestered all of the multivalent cations ($Mg^{2+}$, $Ca^{2+}$, $Fe^{2+}$ and $Fe^{3+}$) from the solution to which it was exposed. Bischofite is a hydrous magnesium chloride mineral having a formula of $MgCl_2 \cdot 6H_2O$. Brucite is the mineral form of magnesium hydroxide having a formula of $Mg(OH)_2$. Calcite is the mineral form of calcium carbonate hydroxide having a formula of $CaCO_3$. Halite is the mineral form of sodium chloride having a formula of NaCl. Iowaite is a mineral form of magnesium containing iron chlorine among other elements, it has a chemical formula of $Mg_4Fe(OH)_8OCl_2 \cdot 4H_2O$. The removal of the divalent and multivalent cations from solution indicates a high potential for gelling inhibition of the friction reducer present in the spearhead acid.

Friction Reducer-Acid Incompatibility

This study was carried out to assess an apparent incompatibility of friction reducer with acid. Initial experiments showed that 0.1 wt % friction reducer could be homogenized in 33% MEA-HCl (in a 1:4.1 ratio), but over time precipitation of the friction reducer was observed (ca. 3 days). This occurred with 0.1 wt % $Fe^{3+}$ and without $Fe^{3+}$ present in the mixture. The precipitate is likely polyacrylic acid which can crosslink through carboxylic acid groups and/or complex to cations in the solution (i.e. $Fe^{3+}$). To test this, 3 000 000 g/mol polyacrylic acid (PAA) was added to a spent 50% solution of MEA-HCl (include the ratio for MEA-HCl (in a 1:4.1 ratio), where, after homogenization of the solution, rapid precipitation of PAA was observed.

Two chelates at 0.1 wt % loadings were tested in mixtures containing a spent solution of 50% MEA-HCl (in a 1:4.1 ratio), where the acid was neutralized with either $CaCO_3$ (s) or the provided cuttings (Corbin 1608—cleaned and washed). To the neutralized acid combinations of friction reducer, $Fe^{3+}$ and chelate were added (Table 2). When chelate is added to the mixture the residue formed a powder; whereas, without chelate a more gel-like precipitate is observed on the filter paper. Note that these reactions are very slow and after filtration there was still precipitate forming in the filtrate, therefore numeric values of precipitate and $Fe^{3+}$ concentrations are not provided.

Procedure:

The first experiment studied the compatibility of friction reducer with FLOJET DR 22430 (FLOJET) and 33% MEA-HCl (incl. 1:4.1 ratio). The samples were mixed with an IKA T18 UltraTuraxx at 25,000 rpm. This was done for several minutes to ensure complete homogenization of the samples. Table 4 contains a sample list. Images after three days were taken to show acid compatibility.

TABLE 4

Compatibility test samples and loadings

| Sample | Acid | Friction reducer | $Fe^{3+}$ (aq) |
|---|---|---|---|
| 1 | 33% MEA-HCl (in a 1:4.1 ratio) | 0.1% FloJet ® | 0.0% |
| 2 | 33% MEA-HCl (in a 1:4.1 ratio) | 0.1% FloJet ® | 0.1% |

In the second experiment the performance of two chelates are tested in order to prevent or reduce the formation of gel-like precipitates. Firstly, 50% MEA-HCl (in a 1:4.1 ratio) is neutralized by addition to $CaCO_3$ (s) or cuttings, the resulting pH of the spent acid is 5.95 and 5.60 respectively. The spent acid is then filtered and divided into separate Nalgene bottles where FLOJET®, $Fe^{3+}$ and chelate are added. The resultant solutions were heated to 90° C. for approximately 72 hrs, cooled to ambient temperature and filtered. A sample list follows in Table 5 below.

TABLE 5

Spent acid testing

| Sample | Base | Acid | Friction reducer | $Fe^{3+}$ (aq) | Chelate |
|---|---|---|---|---|---|
| 3 | Poultry grit | 50% MEA-HCl (in a 1:4.1 ratio) | 0.1% FLOJET | 0.1% | 0.0% |
| 4 | Poultry grit | 50% MEA-HCl (in a 1:4.1 ratio) | 0.1% FLOJET | 0.1% | 0.1% CH1 |
| 5 | Poultry grit | 50% MEA-HCl (in a 1:4.1 ratio) | 0.1% FLOJET | 0.1% | 0.1% CH2 |
| 6 | Cuttings | 50% MEA-HCl (in a 1:4.1 ratio) | 0.1% FLOJET | 0.1% | 0.0% |
| 7 | Cuttings | 50% MEA-HCl (in a 1:4.1 ratio) | 0.1% FLOJET | 0.1% | 0.1% CH1 |
| 8 | Cuttings | 50% MEA-HCl (in a 1:4.1 ratio) | 0.1% FLOJET | 0.1% | 0.1% CH2 |
| 9 | Cuttings | 50% MEA-HCl (in a 1:4.1 ratio) | 0.1% FLOJET | 0.0% | 0.0% |

Subsequently each one of samples 3 to 9 were filtered. The major difference in the samples is the formation of a powdered precipitate in the case of mixtures with chelate, versus gel-like precipitate in the cases where no chelate was added. As stated previously these reactions are very slow so the precipitates final mass and the filtrates final $Fe^{3+}$ concentration has not been quantified. The formation of powder precipitates is desirable over the formation of a gel as a powder may be flowed back out of a well without causing clogging within the wellbore.

Re-Precipitation of Calcium Carbonate in Spent Synthetic or Modified Acid

In order to assess the performance of two chelating agents used in a composition according to the present invention, the re-precipitation of solids from the addition of sodium hydroxide were performed with acid blends spent with cuttings provided by an operator at ambient temperature.

Gluconic acid and lab grade sodium gluconate were tested head-to-head in order to determine their capacity to chelate iron while in the presence of a spent synthetic acid. This is a laboratory method intended on mimicking some of the potential interactions between the chemicals present downhole during a spearhead acid stage. With a loading of 1.0% sodium gluconate vs 1.67% gluconic acid (60% active material), both blends had relatively similar performances. A cloudy haze was observed and once filtered and dried, the precipitate weighed in the range of 0.7 g-1.1 g. This represents approximately 0.2 w % of re-precipitated solid from the total volume of solution.

Figure 2:
FIG. 2 is a photograph of the reprecipitated solids from the addition of NaOH in spent acid blends.
Figure 3:
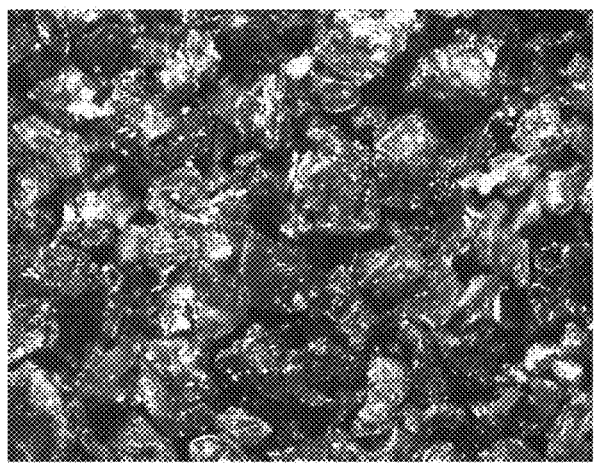
FIG. 3 is a close-up of the reprecipitated solids from FIG. 1.
Figure 4:
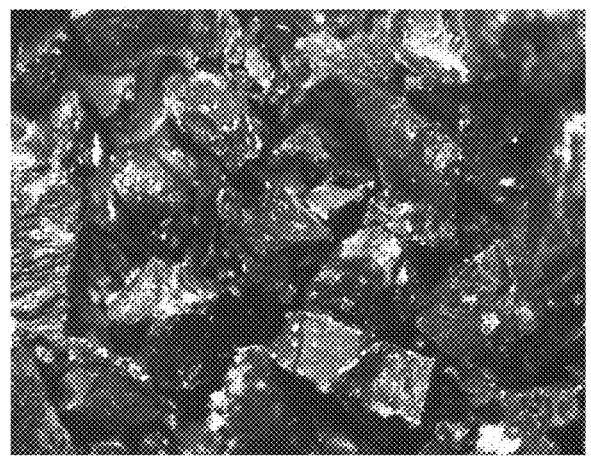
FIG. 4 is a close-up of the reprecipitated solids from FIG. 2.

Procedure:

Two acid blends: 33% MEA-HCl (in a 1:4.1 ratio)-FR with 1.67% gluconic acid and 33% MEA-HCl (in a 1:4.1 ratio)-FR with 1% sodium gluconate, were spent with excess drill cuttings (provided by Encana, Corbin 1608 5H-5X) at ambient temperature. The spent fluids were then filtered through P8 and P2 filter paper. Sodium hydroxide (NaOH) was then added dropwise to 500 mL of the spent acid blends to increase the pH up to 9. A pH probe was placed in the solution to monitor the pH of the solution as it was titrated. The test was performed at ambient temperature on a stir plate. The fluid was then filtered through P2 filter paper and the solids were collected and dried, the results are reported in Table 6. Photos were taken of the solids at 1× and 20× zoom for visual comparison (see FIGS. 1, 2, 3 and 4).

TABLE 6

Results of the re-precipitation testing

| Test | Fluid | Additive | Weight of Reprecipitated Solids (g) |
|---|---|---|---|
| A | 33% MEA-HCl (in a 1:4.1 ratio)-FR | 1.61 w % Gluconic Acid | 0.7807 |
| B | 33% MEA-HCl (in a 1:4.1 ratio)-FR | 1.0 w % Sodium Gluconate | 1.0296 |

NB: the loading of gluconic acid is derived from a commercially available composition which comes in a concentration of 60 wt % gluconic acid.
The actual content of gluconic acid is approximately 0.97 wt %.

The re-precipitated solids consisted of halite with impurities which explains their black color. The value of using gluconic acid or sodium gluconate is two-fold. It is a very selective cation chelator and contrary to EDTA and derivatives thereof, it is readily biodegradable.

The value of the present invention is even more attractive when considering that some in the industry have expressed a desire to increase the loading of friction reducing polymer in the fracking fluid in order to minimize the occurrence of seismic events (i.e. fracking-induced earthquakes). Currently, some fields have shown a 20% occurrence of friction reducing polymer fouling (i.e. sufficient gelling to cause production shutdowns). Estimates for the treatment of a single instance of polymer fouling range from 50,000 $ to 200,000 $, figures which do not take into account the loss production caused by such an event.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

The invention claimed is:

1. A method of spearheading an acid into a wellbore adapted to avoid the gelation of a friction reducer polymer, wherein said method comprises:
    injecting a synthetic acid composition down a wellbore, said composition comprising: a synthetic or modified acid; a solvent; and a chelating agent compound selected from the group consisting of: sodium gluconate and gluconic acid;
    allowing sufficient time for the synthetic or modified acid composition to react with the friction reducer polymer in the wellbore which requires acidic treatment;
    injecting a fracturing composition comprising a liquid and a friction reducing polymer down the wellbore.

2. The method according to claim 1 where the modified acid is selected from the group consisting of: Urea-HCl; amino acid-HCl; and alkanolamine-HCl.

3. The method according to claim 1 where the synthetic acid is selected from the group consisting of: sulfonic acids.

4. The method according to claim 1 where the sulfonic acid is selected from the group consisting of: methansulfonic acid; and toluenesulfonic acid.

5. The method according to claim 1 where the modified acid comprises an amino acid-HCl where the amino acid is selected from the group consisting of: lysine; glycine; sarcosine, betaine (such as trimethyl glycine), dimethyl glycine (DMG), iminodiacetic acid (IDA), alanine, asparagine, aspartic acid, cysteine, glutamic acid, histidine, leucine, lysine, methionine, proline, serine, threonine or valine or combinations thereof.

6. The method according to claim 1 where the modified acid is lysine-HCL.

7. The method according to claim 1 where the modified acid comprises an alkanolamine-HCl, where the alkanolamine is selected from the group consisting of: monoethanolamine; diethanolamine; and triethanolamine.

8. The method according to claim 1 where the modified acid comprises an alkanolamine-HCl, where the alkanolamine is monoethanolamine.

9. The method according to claim 1 where the chelating agent compound is present in the synthetic or modified acid composition in an amount ranging from 0.1 wt % to 5 wt %.

10. The method according to claim 1 where the chelating agent compound is present in the synthetic or modified acid composition in an amount ranging from 0.5 wt % to 2 wt %.

11. The method according to claim 1 where the chelating agent compound is present in the synthetic or modified acid composition in an amount of about 1 wt %.

12. The method according to claim 1, wherein the composition further comprise a corrosion inhibitor package.

13. A method of spearheading an acid into a wellbore adapted to reduce the gelation of a friction reducer polymer, wherein said method comprises:
    injecting a synthetic or modified acid composition down a wellbore, said composition comprising: a synthetic or modified acid; a solvent; and a chelating agent compound selected from the group consisting of: sodium gluconate and gluconic acid;
    allowing sufficient time for the synthetic or modified acid composition to react with the friction reducer polymer in the wellbore in the wellbore which requires acidic treatment;
    injecting a fracturing composition comprising a liquid and a friction reducing polymer down the wellbore.

14. The method according to claim 13, wherein the composition further comprise a corrosion inhibitor package.

15. A method of selectively depleting divalent cations present in a spent spearheading acid composition into a wellbore, wherein said method comprises:
    injecting a synthetic or modified acid composition down a wellbore, said composition comprising: a synthetic or modified acid; a solvent; and a chelating agent compound selected from the group consisting of: sodium gluconate and gluconic acid;
    allowing sufficient time for the synthetic or modified acid composition to react with the divalent cations in the spent spearheading acid composition in the wellbore which requires acidic treatment; and
    allowing sufficient time for the chelating agent to remove cations of the spent spearheading acid.

16. The method according to claim 15, wherein said method further comprises the injection of a fracturing composition comprising a liquid and a friction reducing polymer down the wellbore.

17. The method according to claim 15, wherein the composition further comprise a corrosion inhibitor package.

\* \* \* \* \*